United States Patent [19]

Vogel

[11] Patent Number: 4,642,201

[45] Date of Patent: Feb. 10, 1987

[54] COMPOSITIONS FOR IMPROVING THE STABILITY OF INTERCALATED GRAPHITE STRUCTURAL MEMBERS

[75] Inventor: Ferdinand L. Vogel, Whitehouse Station, N.J.

[73] Assignee: Intercal Company, Port Huron, Mich.

[21] Appl. No.: 770,158

[22] Filed: Aug. 27, 1985

[51] Int. Cl.$^4$ .............................................. H01B 1/04
[52] U.S. Cl. .................................. 252/503; 252/506; 252/511
[58] Field of Search ............... 252/502, 503, 506, 511; 423/445

[56] References Cited

U.S. PATENT DOCUMENTS 4,414,142  11/1983  Vogel et al. ..................... 252/506
4,565,649   1/1986  Vogel ............................. 252/506

*Primary Examiner*—Josephine L. Barr
*Attorney, Agent, or Firm*—Kenyon & Kenyon

[57] ABSTRACT

Members, such as bearings, gaskets, electrical conductors and the like, as well as containing coatings, made from graphite intercalated with a metal halide exhibit superior stability except when used or stored in an extremely humid atmosphere. In a humid atmosphere these members and coatings tend to swell, crack and develop a corrosion layer over time. In accordance with the present invention, however, members and coatings made from intercalated graphite mixed with from 2 vol. % to about 30 vol. % of a metal powder do not exhibit this environmental instability.

14 Claims, No Drawings

COMPOSITIONS FOR IMPROVING THE STABILITY OF INTERCALATED GRAPHITE STRUCTURAL MEMBERS

This invention relates to compositions that improve the environmental stability of members and composites such as bearings, gaskets, electrical contacts, conductive and lubricating coatings, and the like, comprised of intercalated graphite.

BACKGROUND OF THE INVENTION

It has recently been discovered that intercalated graphite has characteristics such as high electrical conductivity, good lubricity and the ability to form strong, coherent bodies, thus making it ideally suited for formation into members such as gaskets, bearings, electrical contacts and the like or for use in conductive, self-lubricating coatings. Also, the electrically conducting and lubricating characteristics of intercalated graphite can be successfully applied by dispersing it in a matrix to form a composite.

In general, many intercalated graphites display superior stability in air and at elevated temperatures. However, certain intercalated graphite (i.e., those intercalated with the metal halides) tend to exhibit some environmental instability when used or stored under extremely high humidity. When members, composites or coatings formed from such intercalated graphites are exposed to extremely high humidity for an extended period, swelling and cracking takes place and a corrosion layer forms on the surface.

In addition, when certain of these intercalated graphite are mixed with polymer powders or resins (i.e., a thermoplastic or a thermoset), or ceramic powders and then formed into a structural member or coating, the member or coating will begin to exhibit salt-like growths on its surface when it is exposed to extremely high humidity.

It is, therefore, an object of the invention to provide a metal halide intercalated graphite powder which may be formed into a member or coating that does not exhibit corrosion upon exposure to a extremely damp atmosphere.

It is another object of this invention to provide metal halide intercalated graphite members and coatings which do not crack, swell, or corrode when exposed to high humidity.

Still another object of the invention is to provide a metal halide intercalated graphite/polymer, metal or ceramic composite that when formed into a suitable member will show resistance to corrosion.

SUMMARY OF THE INVENTION

According to the invention, these and other objects are achieved by forming the desired member or coating from a metal halide intercalated graphite that is mixed with a metal such as copper, nickel, silver, molybdenumm or tungsten.

The stable members of the present invention are formed from an intercalated graphite/metal powder mixture which may be compressed either uniaxially (i.e., a die or mold) or isostatically (i.e., in a pressurized fluid) to form a compact of the described shape and strength and is, in addition to the metal powders, the compact may contain metal reinforcement, polymer resins or powders, ceramic powders and even exfoliated graphite. The compact may already be in the desired form or alternatively may be milled in a lathe to the desired shape.

The stable coatings of the present invention are formed from a intercalcated graphite/metal powder mixture which is suspended in liquid resin binder and optionally a solvent. The coating is applied to a surface and cured in a manner known to those skilled in the art to form a hard environmental stable surface.

DETAILED DESCRIPTION OF THE INVENTION

Intercalated graphite has several properties which may be used advantageously in forming useful three dimensional members, as well as, in surface coatings. When graphite is intercalated, it exhibits certain metal-like properties including increased electrical conductivity, luster and ductility. Additionally, intercalated graphite, when compression molded, forms a coherent, strong three dimensional body. In contrast, non-intercalated graphite, when formed in a similar fashion, produces a body which is extremely weak and friable Furthermore, intercalated graphite exhibits improved self-lubricating properties.

These characteristics allow for intercalated graphite compositions which are suitable for use (when formed into the appropriate shape) as bearings, gaskets, electrical contacts (such as motor brushes, electro discharge tools, etc.), electrical conductors, conductive coatings and the like.

The intercalated graphite compounds suitable for use with the foregoing members are those which are stable in air. The intercalated compounds having this property include but are not limited to those intercalated with metal halides such as halides of the transition elements, halides of Group III A, IV A, V A and VI A metals or metalloids. The preferred Group III A metals and metalloids being Boron, Aluminum, Gallium and Indium.

Of these metal halides, the preferred intercalating species are copper chloride, nickel chloride, and chromium chloride.

After the graphite is intercalated, if a three dimensional member is desired, the intercalcated graphite is formed into the desired shape in a mold through the action of pressure and temperature either uniaxially, isostatically or using a combination of both.

In addition to intercalated graphite, the molded members may optionally include metal reinforcement, polymers, ceramic powders and the like.

If an intercalcated graphite coating is desired, the intercalcated graphite is suspended in a liquid binder and, optionally, a suitable solvent. The mixture is coated on a surface and cured to a hard self-lubricating, electrically conductive surface.

In general, the metal halide intercalated graphites are stable intercalated graphite compounds. However, members and coatings made from these intercalated graphites may suffer from environmental stability problems under certain conditions. Metal halide intercalated graphites used or stored in extremely damp air (i.e. 80% R.H. and above) for an extended period of time (30 to 90 days or more) begin to swell and crack. In addition, a corrosion layer may form on the surface of the member.

This problem, as it occurs in intercalated graphite members, appears to be a function of the temperature and pressure used to form the member, as well as, the type of graphite used. However, this problem is also seen in intercalated graphite containing coatings. Since these coatings are typically not prepared at elevated temperatures and pressure, the environmental insalibility problem seems to be mainly a funciton of the type of graphite used.

Table I, demonstrates this situation for a copper chloride intercalated graphite member stored in an atmosphere having a 80% R.H.

TABLE I

| Forming Pressure (PSI) | Forming Temperature (°C.) | Time* (DAYS) |
|---|---|---|
| 10,000 | 20 | >400 |
| 1,000 | 200 | 62 |
| 115,000 | 20 | 5 |
| 50,000 | 200 | 30 |

*For appearance of the corrosion, cracking, etc.

An alternative for alleviating this difficulty is to use low member forming pressures and temperatures and to use intercalated graphite members and structures under moderate to normal humidity applications or to limit the types of graphites to those which are known not to suffer from environmental instability. However, the lowering of the forming temperature and pressure leads to a comparable reduction in hardness and strength and thus, the humidty restriction would limit the applicability of the intercalated graphite members.

In accordance with the present invention, a metal halide intercalated graphite which is mixed with certain amounts of transition metals, such as nickel, copper, silver molybdenum or tungsten prior to the member forming step does not exhibit the environmental instability described above. These metals are preferably used in powder form, however, the required metal content may alternatively be provided by electrodeposition of the metal onto the intercalated graphite or by reducing a metal halide mixed with the intercalated graphite to a metal.

The amount of metal powder mixed with the intercalated graphite may vary from about 2 vol. % to about 30 vol %. The amount used depends on forming temperature and pressure applied when the intercalated graphite/metal mixture is formed into a usable member. Table II indicates the amount of copper powder required to eliminate the instability of a member formed from copper chloride intercalated graphite.

TABLE II

| Forming Pressure (PSI) | Forming Temperature (°C.) | Vol. % Copper |
|---|---|---|
| 100,000 | 20 | 2 |
| 100,000 | 100 | 16 |
| 100,000 | 200 | 30 |
| 10,000 | 20 | 2 |
| 10,000 | 100 | 2 |
| 10,000 | 200 | 2 |

More than 30 vol % metal may be added if the application requires, however, 30 vol. % appears to be the maximum amount of metal needed to prevent the above described environmental instability.

The intercalated graphite/metal powder mixture may be mixed together in any known manner which produces a thoroughly mixed composition. For example, a vibrating mixer provides suitable results. The metal employed should be finely divided powder having a size of about 20 microns to about 100 microns.

After the mixing step is complete, the mixture may be formed into a suitable member using the methods described above.

If it is desired, the metal intercalated graphite mixture may further contain a thermosetting or a theromplastic polymer or a ceramic powder. In addition, the members formed from the metal intercalated/graphite mixture, may contain metal reinforcing and may even be encased in metal depending upon the use to which the particular member will be put.

What is claimed is:

1. A powder for forming an environmentally stable member, comprising:
   a metal halide intercalated graphite; and
   a metal selected from the group consisting of copper, nickel, silver, molybdenum and tungsten; wherein said metal comprises from about 2 volume percent to about 30 volume percent of said environmentally stable powder.

2. An environmentally stable intercalated graphite member comprising a compact body formed from:
   a metal halide intercalated graphite; and
   a finely divided metal powder selected from the group consisting of copper, nickel, silver, molybdenum and tungsten; wherein said finely divided metal powder comprises from about 2 volume percent to about 30 volume percent of said compact body.

3. An environmentally stable intercalated graphite coating comprising:
   a metal halide intercalated graphite;
   a finely divided metal powder selected from the group consisting of copper, nickel, molybdenum and tungsten; and
   a liquid resin binder; wherein said metal powder comprises from about 2 volume percent to about 30 volume percent of said coating based on the total volume of the intercalated graphite and metal powder.

4. The powder in accordance with claim 1 wherein the metal is a finely divided metal powder.

5. The powder in acordance with claim 4 wherein the metal halide is selected from the group consisting of a halide of a transition element, a halide of a group III A, IV A, V A and VI A metal or metalloid.

6. The powder in accordance with claim 5 wherein the metal halide is selected from the group consisting of copper chloride, cobalt chloride, nickel chloride, chromium chloride, cadmium chloride and ferric chloride.

7. The member in accordance with claim 2 wherein the metal halide is selected from the group consisting of a halide of a transition element, a halide of a group III A, IV A, V A and VI A metal or metalloid.

8. The member in accordance with claim 2, wherein the member further comprises a polymer selected from the group of a thermoplastic and a thermosetting polymer.

9. The member in accordance with claim 2 further comprising ceramic powder.

10. A member in accordance with claim 2, wherein the member is a bearing.

11. A member in accordance with claim 2, wherein the member is a gasket.

12. A member in accordance with claim 2, wherein the member is an electric contact.

13. The coating in accordance with claim 3 wherein the metal halide is selected from the group consisting of halide of a transition element, a halide of a group III A, IV A, V A and VI A metal or metalloid.

14. The coating in accordance with claim 13 wherein the metal halide is selected from the group consisting of copper chloride, cobalt chloride, nickel chloride, chromium chloride, cadmium chloride and ferric chloride.

* * * * *